US011352130B2

(12) United States Patent
Loveland et al.

(10) Patent No.: US 11,352,130 B2
(45) Date of Patent: Jun. 7, 2022

(54) FULLY FAIRED LANDING GEAR WITH INTEGRATED STEP

(71) Applicant: Bell Textron Inc., Fort Worth, TX (US)

(72) Inventors: Steven Loveland, Fort Worth, TX (US); Paul Charles Griffiths, Roanoke, TX (US); Allen Brittain, Flower Mound, TX (US)

(73) Assignee: Textron Innovations Inc., Providence, RI (US)

(*) Notice: Subject to any disclaimer, the term of this patent is extended or adjusted under 35 U.S.C. 154(b) by 246 days.

(21) Appl. No.: 16/733,806

(22) Filed: Jan. 3, 2020

(65) Prior Publication Data

US 2020/0216170 A1 Jul. 9, 2020

Related U.S. Application Data

(60) Provisional application No. 62/788,143, filed on Jan. 4, 2019.

(51) Int. Cl.
| | |
|---|---|
| *B64C 25/04* | (2006.01) |
| *B64C 25/34* | (2006.01) |
| *B64C 25/52* | (2006.01) |
| *B64C 25/06* | (2006.01) |
| *B64C 25/32* | (2006.01) |

(52) U.S. Cl.
CPC ............. *B64C 25/34* (2013.01); *B64C 25/06* (2013.01); *B64C 25/52* (2013.01); *B64C 2025/325* (2013.01)

(58) Field of Classification Search
CPC ......... B64C 25/34; B64C 25/06; B64C 25/52; B64C 2025/325; B64C 7/00; B64C 2025/003; B64C 1/24
See application file for complete search history.

(56) References Cited

U.S. PATENT DOCUMENTS

| | | | | |
|---|---|---|---|---|
| 1,488,720 | A * | 4/1924 | Tichy | B60R 11/06 280/164.1 |
| 3,778,011 | A * | 12/1973 | Cannon | B64C 27/00 244/137.1 |
| 3,904,155 | A * | 9/1975 | Chavis | B64C 27/00 244/118.1 |
| 4,440,364 | A * | 4/1984 | Cone | B64C 1/24 16/282 |
| 4,609,168 | A * | 9/1986 | Dean | A61G 3/0891 244/118.1 |
| D287,714 | S * | 1/1987 | Short | D12/345 |
| 4,637,575 | A * | 1/1987 | Yenzer | H02G 1/02 174/5 R |

(Continued)

*Primary Examiner* — Assres H Woldemaryam
(74) *Attorney, Agent, or Firm* — Lightfoot & Alford PLLC

(57) ABSTRACT

An aircraft landing gear assembly has a longitudinally elongated frame coupled to a lower portion of a fuselage of an aircraft, the frame being capable of supporting at least a portion of the weight of the aircraft. A fairing encloses substantially all of the frame. An optional integrated step can be carried by the frame, and a longitudinally elongated aperture would be formed in the fairing adjacent the step. The step allows a user to place a foot into the aperture and onto the step. An optional door can cover the aperture, and an optional secondary step can be carried by the door.

20 Claims, 7 Drawing Sheets

(56) References Cited

U.S. PATENT DOCUMENTS

| | | | | |
|---|---|---|---|---|
| 5,228,707 A | * | 7/1993 | Yoder | B60R 3/02 |
| | | | | 182/127 |
| 5,806,627 A | * | 9/1998 | Wilson | B64D 9/00 |
| | | | | 182/127 |
| 5,961,071 A | * | 10/1999 | Proctor | B64D 9/00 |
| | | | | 244/118.2 |
| 9,108,479 B1 | * | 8/2015 | Calvert | B64C 25/405 |
| 2009/0277992 A1 | * | 11/2009 | Kismarton | B64C 25/06 |
| | | | | 244/104 LS |
| 2017/0369159 A1 | * | 12/2017 | Fink | B64D 37/04 |
| 2020/0189726 A1 | * | 6/2020 | Fortier | B64C 25/24 |

\* cited by examiner

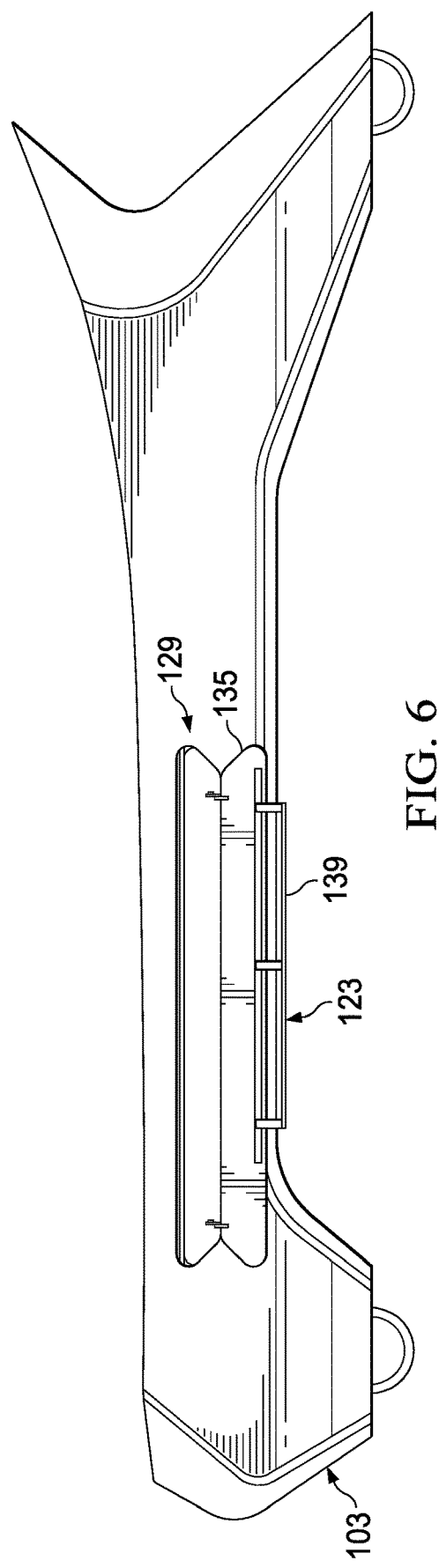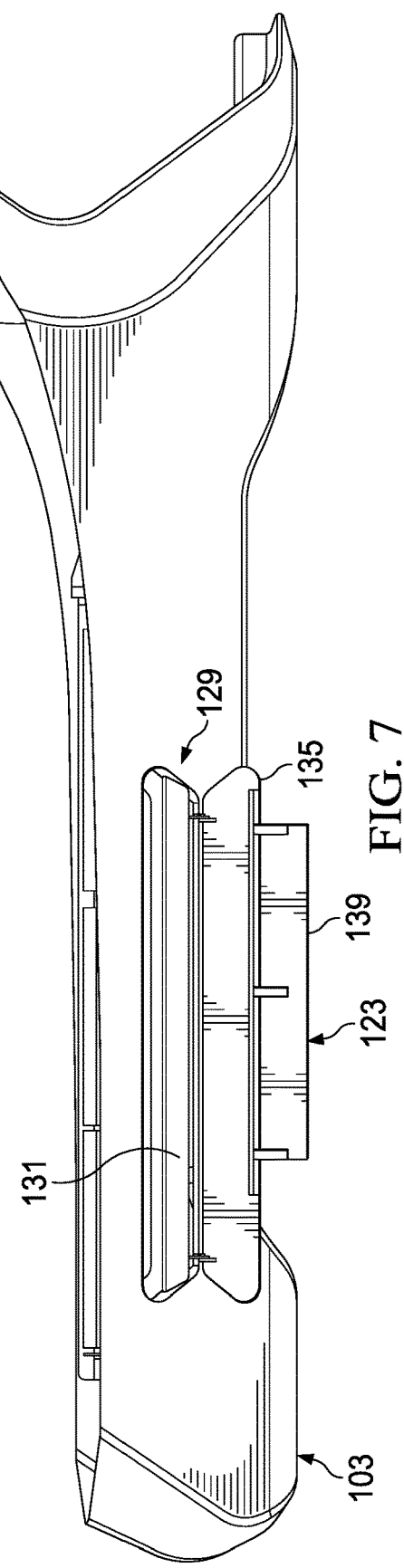

_US 11,352,130 B2_

FULLY FAIRED LANDING GEAR WITH INTEGRATED STEP

CROSS-REFERENCE TO RELATED APPLICATIONS

This application claims priority to U.S. Provisional Patent Application No. 62/788,143, filed on 4 Jan. 2019 by Steven Loveland, et al., and titled "Fully Faired Landing Gear with Integrated Step," the disclosure of which is incorporated by reference in its entirety.

STATEMENT REGARDING FEDERALLY SPONSORED RESEARCH OR DEVELOPMENT

Not applicable.

BACKGROUND

Nonretractable aircraft landing gear, such as wheeled gear or fixed skids, remains in the airstream adjacent the aircraft during flight. Due to forces on the landing gear caused by aerodynamic drag, nonretractable landing gear is typically used on low-speed aircraft, such as small fixed-wing aircraft and helicopters. To reduce the amount of drag, skid landing gear may be formed from narrow cylindrical or airfoil-shaped tubes, and wheeled landing gear may have wheel fairings for covering the wheels.

BRIEF DESCRIPTION OF THE DRAWINGS

FIG. 6 is a left side view of the deployed step of FIG. 5.

FIG. 7 is a top view of the deployed step of FIG. 5.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
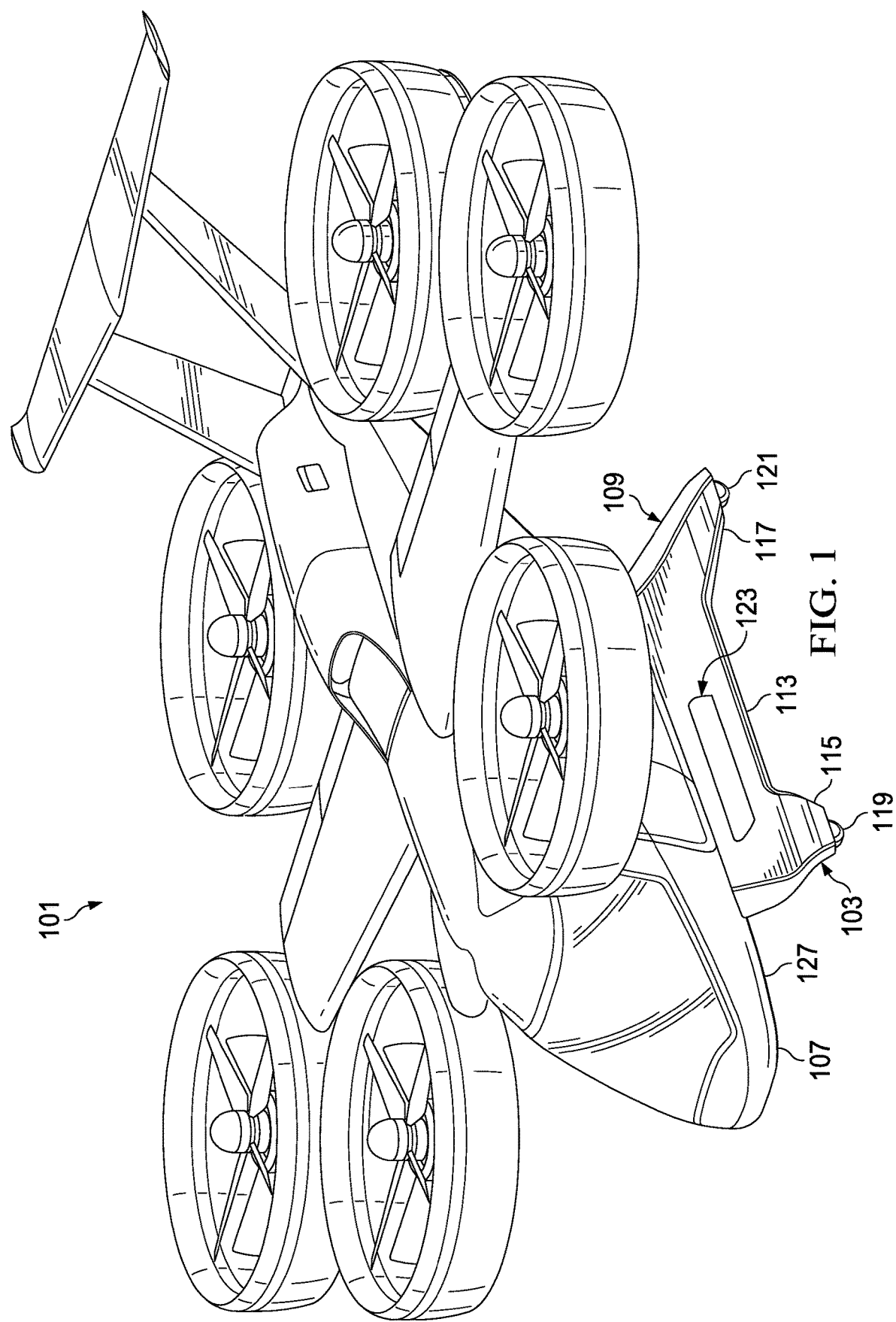
FIG. 1 is an oblique view of an aircraft with fully faired landing gear and an integrated step, both according to this disclosure.
Figure 2:
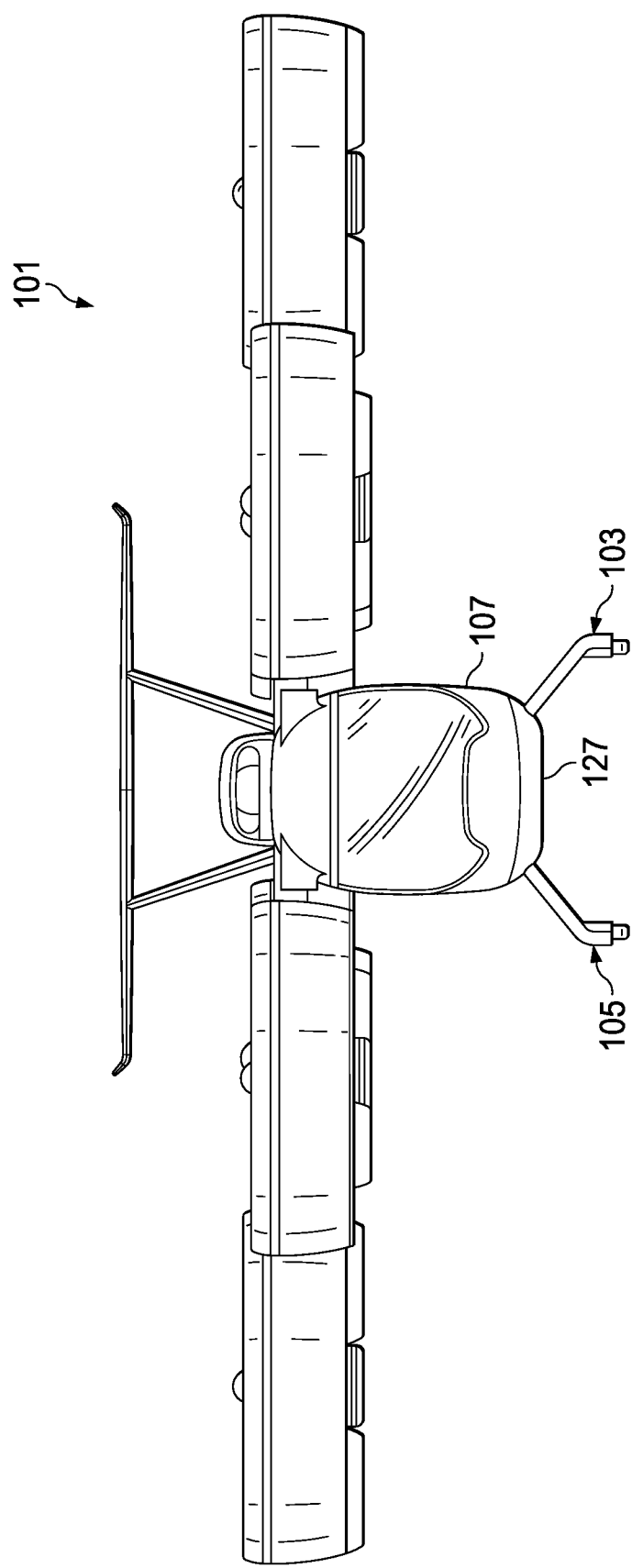
FIG. 2 is a front view of the aircraft of FIG. 1.
Figure 3:
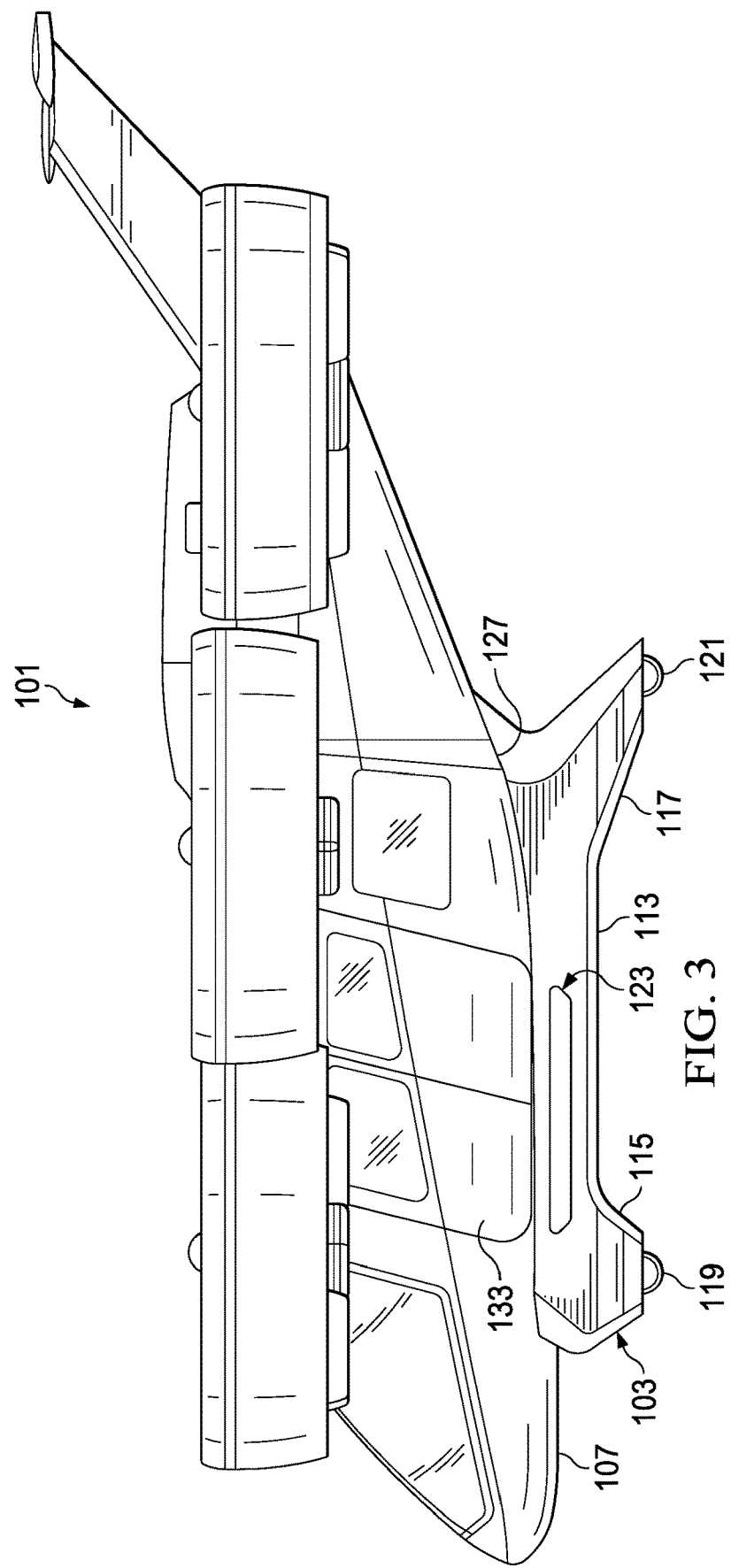
FIG. 3 is a side view of the aircraft of FIG. 1.
Figure 8:
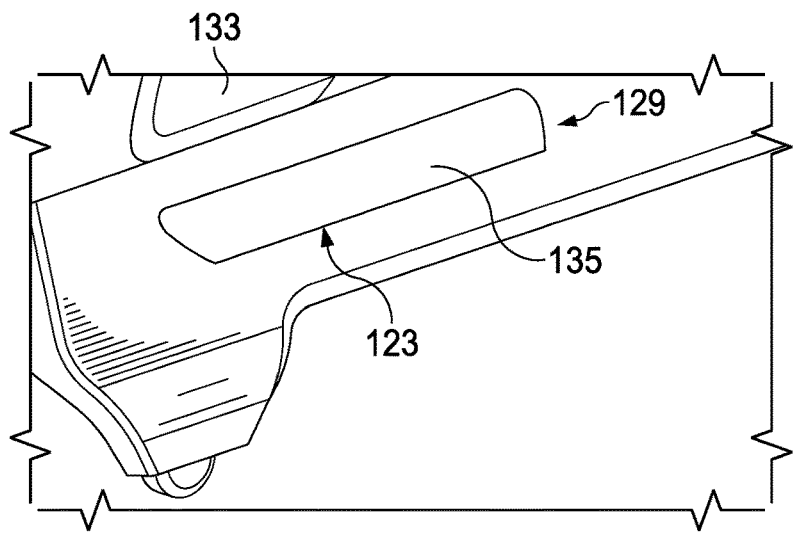
FIGS. 8 through 10 are oblique views of the steps of deploying the step of FIG. 5.
Figure 9:
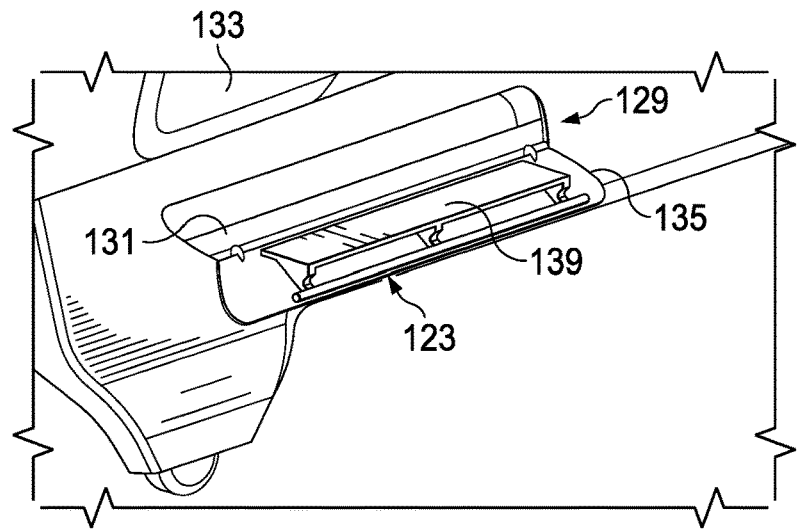
Figure 10:
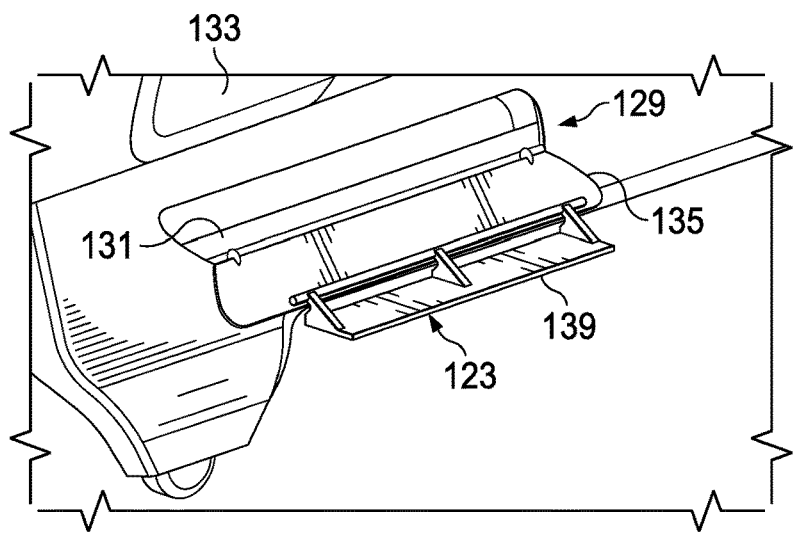

This disclosure divulges a fully faired landing gear for aircraft and an optional integrated landing-gear step. FIGS. 1 through 3 illustrate the landing gear with the step in a retracted position, and FIGS. 4 through 7 illustrate the step in a deployed position. FIGS. 8 through 10 illustrate the stages of step deployment.

Referring to FIGS. 1 through 7, an aircraft 101 comprises a left landing gear assembly 103 and a right landing gear assembly 105, assemblies 103, 105 being located on opposite sides of an aircraft centerline and depending from a lower portion of aircraft fuselage 107. Right gear assembly 105 is preferably a mirror of left gear assembly 103, and the following discussion will focus on left assembly 103, though it will be understood that the description is equally applicable to right assembly 105.

Figure 4:
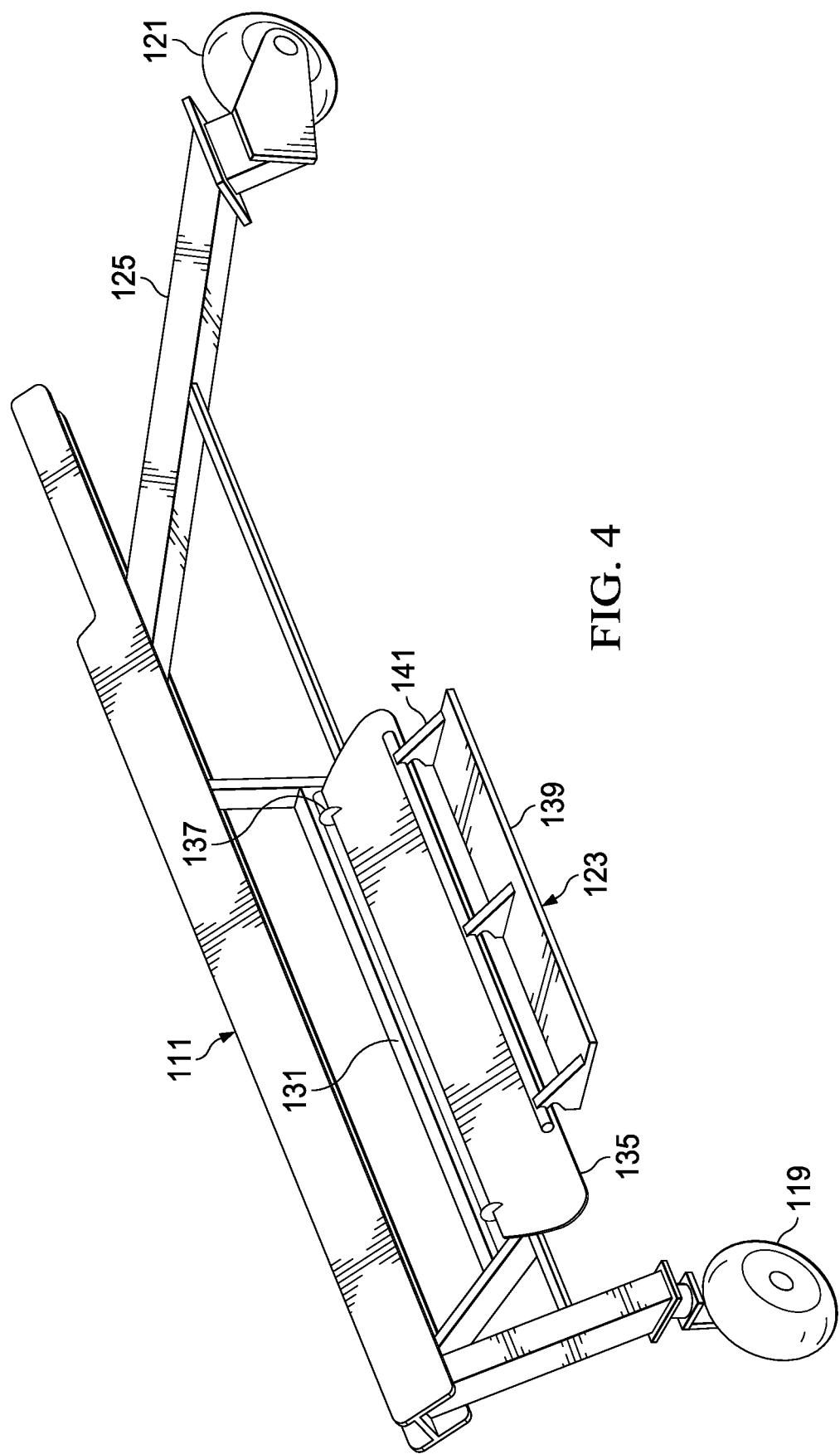
FIG. 4 is an oblique view of a left frame of the landing gear of FIG. 1.
Figure 5:
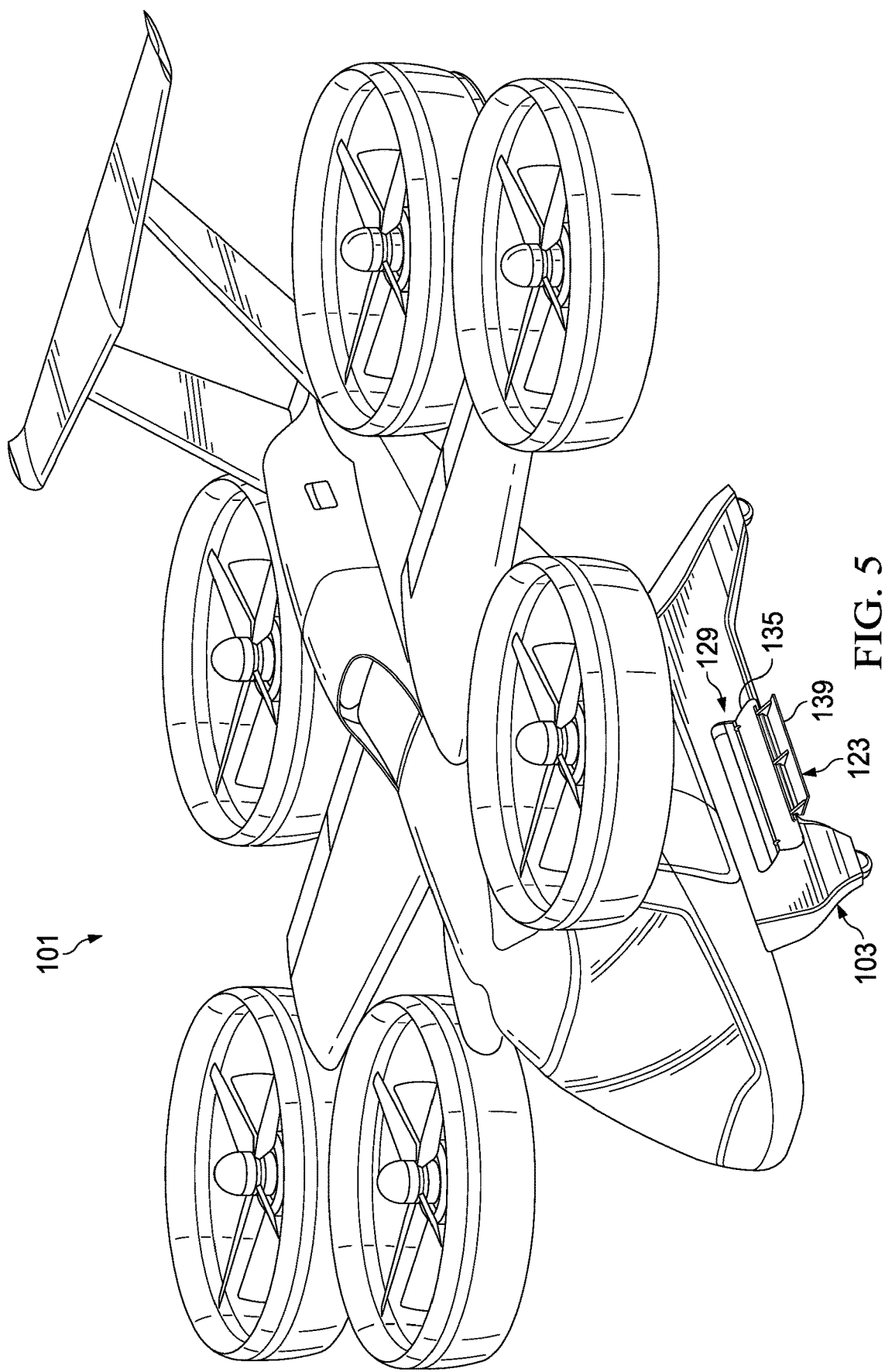
FIG. 5 is an oblique view of the aircraft of FIG. 1, the integrated step being configured in a deployed position.

Gear assembly 103 is constructed as a fairing 109 over a frame 111 (visible in FIG. 4). Assembly 103 comprises an elongated narrow body 113 and legs 115, 117 depending from body 113. Front leg 115 has an optional wheel 119 protruding from within leg 115, and rear leg 117 likewise has an optional wheel 121 protruding from within leg 117. Front wheel 119 is preferably steerable for ground operations, and wheels 119, 121 are optionally retractable to a position within fairing 109. Wheels 119, 121 or pads used instead of wheels 119, 121 may have sensors for determining the weight of aircraft 101. An optional step assembly 123 is shown installed in body 113 of gear 103.

As visible in FIG. 4, frame 111 is a space frame preferably formed from a plurality of rigid tubular members 125 configured to provide support for the weight of aircraft 101 and resist forces encountered during landings. In addition, assembly 103 can be designed for elastic deformation and/or selective collapse to absorb energy during a hard landing. Frame 111 is preferably coupled to a floor structure (not shown) adjacent lower surface 127 of fuselage 107.

As most easily visible in FIG. 2, assemblies 103, 105 have a narrow lateral width and present a small front cross-sectional area. Fairing 109 fully encloses frame 111 for smoothing airflow over frame 111, reducing drag and noise generated during forward flight. In addition, the longitudinally elongated and laterally narrow shape of assemblies 103, 105 allow for their use as stabilizing strakes.

Optional step assembly 123 is installed in a longitudinally elongated aperture, such as slot 129 of fairing 109. Slot 129 is positioned so that the lower portion of slot 129 is adjacent an integrated step 131 rigidly mounted to frame 111 or supported by a member 125 of frame 111. The positioning of slot 129 allows the foot of a user to be inserted into slot 129 to place the foot on step 131 for assisting the user in entering fuselage 107 through doors 133.

Step assembly 123 comprises a door 135 coupled by hinges 137 to fairing 109 and shaped to close the outboard side of slot 129, providing for smooth airflow over slot 129 during forward flight. Hinges 137 are located at the bottom of door 135, so that the top of door 135 swings downward. An optional secondary step 139 is coupled to the inside of the top of door 135 by hinges 141, allowing for secondary step 139 to be rotated outward and downward from door 135. As shown in FIGS. 4 through 7 and 10, when secondary step 139 is deployed, a user entering aircraft 101 may first step onto secondary step 139, then step onto integrated step 131, and then step into fuselage 107 through doors 133. The stages of deployment of step assembly 123 are shown in FIGS. 8 through 10.

Deployment of step assembly 123 may be accomplished in a number of ways. For example, deployment may be initiated at door 133 or may be initiated remotely. Door 135 may be secured in the closed position adjacent fairing 109 in any appropriate manner, including, for example, detents, latches, magnetic closures, or other selectively releasable devices. Release of door 135 may be accomplished using mechanical, electrical or electromechanical devices, such as, for example, buttons, knobs, handles, and/or cables or other appropriate devices. Release of door 135 may be integrated with operation of cabin door 133, allowing for opening of doors 133 to deploy step assembly 123. Secondary step 139 may be configured to automatically deploy when door 135 is opened, or deployment of step 139 may be a manual operation.

It should be noted that step assembly 123 is optional, and integrated step 131 may be used with or without step assembly 123. A door, like door 135, may be used to close the outboard side of slot 129 without the use of secondary step 139.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft landing gear assembly, comprising:
   a longitudinally elongated frame configured to be coupled to a lower portion of a fuselage of an aircraft and support at least a portion of the weight of the aircraft;
   a fairing enclosing substantially all of the frame;
   an integrated step carried by the frame;
   an aperture in the fairing adjacent the step; and
   a door carried by the frame and selectively movable between a closed position, in which the aperture is covered, and an open position, in which the aperture is uncovered and allows access to the integrated step.

2. The assembly of claim 1, further comprising:
   a secondary step carried by the door and deployable when the door is in the open position.

3. The assembly of claim 1, further comprising:
   a secondary step hingedly coupled to the door;
   wherein the secondary step is rotatable to a deployed position when the door is in the open position.

4. The assembly of claim 1, wherein the frame forms a body and at least one leg depending from the body.

5. The assembly of claim 1, wherein the frame forms a body and at least one leg depending from the body; and
   wherein a wheel is located at the bottom of the at least one leg.

6. The assembly of claim 1, wherein the frame forms a body and a pair of legs, each leg depending from an end portion of the body.

7. The assembly of claim 1, wherein the frame forms a body and a pair of legs, each leg depending from an end portion of the body; and
   wherein a wheel is located at each leg.

8. The assembly of claim 1, wherein a pair of assemblies are located on opposite sides of an aircraft centerline.

9. A landing gear assembly for an aircraft having a fuselage, the assembly comprising:
   a longitudinally elongated frame configured to be coupled to a lower portion of the fuselage and support at least a portion of the weight of the aircraft;
   an aerodynamic fairing covering the frame;
   an integrated step carried by the frame;
   an aperture in the fairing adjacent the step; and
   a door carried by the frame and selectively movable between a closed position, in which the aperture is covered, and an open position, in which the aperture is uncovered and allows access to the integrated step;
   wherein the step is configured to allow a user to place a foot into the aperture and onto the step.

10. The assembly of claim 9, further comprising:
    a secondary step carried by the door and deployable when the door is in the open position.

11. The assembly of claim 9, further comprising:
    a secondary step hingedly coupled to the door;
    wherein the secondary step is rotatable to a deployed position when the door is in the open position.

12. The assembly of claim 9, wherein the frame forms a body and at least one leg depending from the body.

13. The assembly of claim 9, wherein the frame forms a body and at least one leg depending from the body; and
    wherein a wheel is located at the bottom of the at least one leg.

14. The assembly of claim 9, wherein the frame forms a body and a pair of legs, each leg depending from an end portion of the body.

15. The assembly of claim 9, wherein the frame forms a body and a pair of legs, each leg depending from an end portion of the body; and
    wherein a wheel is located at each leg.

16. The assembly of claim 9, wherein a pair of assemblies are located on opposite sides of an aircraft centerline.

17. An aircraft, comprising:
    a fuselage; and
    a landing gear assembly, comprising:
      a longitudinally elongated frame coupled to the fuselage;
      an integrated step carried by the frame;
      a fairing enclosing substantially all of the frame;
      an aperture in the fairing adjacent the step; and
      a door carried by the frame and selectively movable between a closed position, in which the aperture is covered, and an open position, in which the aperture is uncovered and allows access to the integrated step;

wherein the step is adapted to allow a user to place a foot into the aperture and onto the step.

18. The aircraft of claim 17, further comprising:

a secondary step carried by the door and deployable when the door is in the open position.

19. The aircraft of claim 17, further comprising:

a secondary step hingedly coupled to the door;

wherein the secondary step is rotatable to a deployed position when the door is in the open position.

20. The aircraft of claim 17, further comprising:

a second landing gear assembly;

wherein the landing gear assemblies are located on opposite sides of an aircraft centerline.

* * * * *